Feb. 16, 1965    C. B. ALEXANDER, JR., ETAL    3,169,619

MECHANICAL POSITIONING DEVICE

Filed June 26, 1961

INVENTORS
CLAIR B. ALEXANDER JR.
GUY S. MAHAN

BY Price & Heneveld

ATTORNEYS

United States Patent Office 3,169,619
Patented Feb. 16, 1965

3,169,619
MECHANICAL POSITIONING DEVICE
Clair B. Alexander, Jr., Akron, and Guy S. Mahan, Hudson, Ohio, assignors to International Basic Economy Corporation, New York, N.Y., a corporation of New York
Filed June 26, 1961, Ser. No. 119,694
3 Claims. (Cl. 192—143)

This invention relates to controls for machine tools, and more particularly to a sequential linear positioner.

In the control of automatic machine tools, it is often necessary to move a work table to various positions in sequence to carry out a series of manufacturing operations.

Each of the positions of the work table may be defined in terms of the distance X from a fixed reference point if its movement is linear, planar coordinates X, Y if its movement is planar, or spatial coordinates X, Y, and Z if its movement is three-dimensional. Assuming that the movement of the table is linear, each of its working positions can be reached from its rest position by displacing it linearly by a predetermined amount X. This invention is concerned with a mechanism by which the table can be thus moved any desired amount in a single direction required for positioning of the table for each of a plurality of successive manufacturing operations. If the movement of the table is planar, two of the inventive devices must be used at right angles to each other, and for spatial positioning, three of the devices of this invention are necessary.

The problem to be solved by the device shown, therefore, is that of linearly displacing a work table a given amount from its rest position for a first manufacturing operation, withdrawing it to the rest position when the first operation is completed, displacing the work table a different predetermined amount for a second manufacturing operation, and so forth until a manufacturing cycle is completed and another piece is put onto the table in readiness for the first manufacturing operation.

The device of this invention solves this problem by providing the work table with a linearly movable actuator shaft whose linear movement is transmitted to the work table in any desired manner. Linear motion may be imparted to the actuator shaft by a fluid cylinder piston rod or equivalent reciprocating machine member which is rigidly connected to the actuator shaft. A trip dog is mounted on the actuator shaft in such a manner that each time the actuator shaft is driven forward, the trip dog engages one of a number of adjustable stop elements disposed in a circular arrangement about the actuator shaft. The engagement of a stop element by the trip dog moves it forward to stop the forward movement of the actuator shaft and to close an electrical switch which, through appropriate circuitry, initiates the manufacturing operation. When the manufacturing operation is completed, the drive means moves the actuator shaft back to its rest position and in doing so, rotates the trip dog about the actuator shaft a sufficient amount so that the next time the actuator shaft moves forward, the trip dog will engage the next adjustable stop element. Each of the stop elements is individually adjustable so that for each manufacturing operation, the amount of forward travel of the actuator shaft before the trip dog engages the stop element can be accurately set.

It is therefore the object of this invention to provide a sequential linear positioning device whose sequential movements are determined by a series of adjustable stops disposed in a circular pattern about a linearly movable member and adapted to be engaged in sequence by a trip dog mounted on the linearly movable member.

It is a further object of this invention to provide novel means of moving the trip dog from one position to the next.

These and other objects of this invention will become apparent from a reading of the following specification, taken in connection with the attached drawings in which.

Basically, the device of this invention consists of a reciprocating actuator shaft whose forward movement (toward the right in FIG. 1) is limited on each stroke by the distance a trip dog carried by a striker member mounted on the actuator shaft can travel before striking one of a plurality of individually adjustable stop assemblies disposed about the shaft. Stationary ratchet means are provided so that at the end of each rearward stroke of the shaft, the striker member is engaged by the ratchet and moved to a position where its trip dog will engage the next stop assembly on the next forward stroke.

Figure 1:
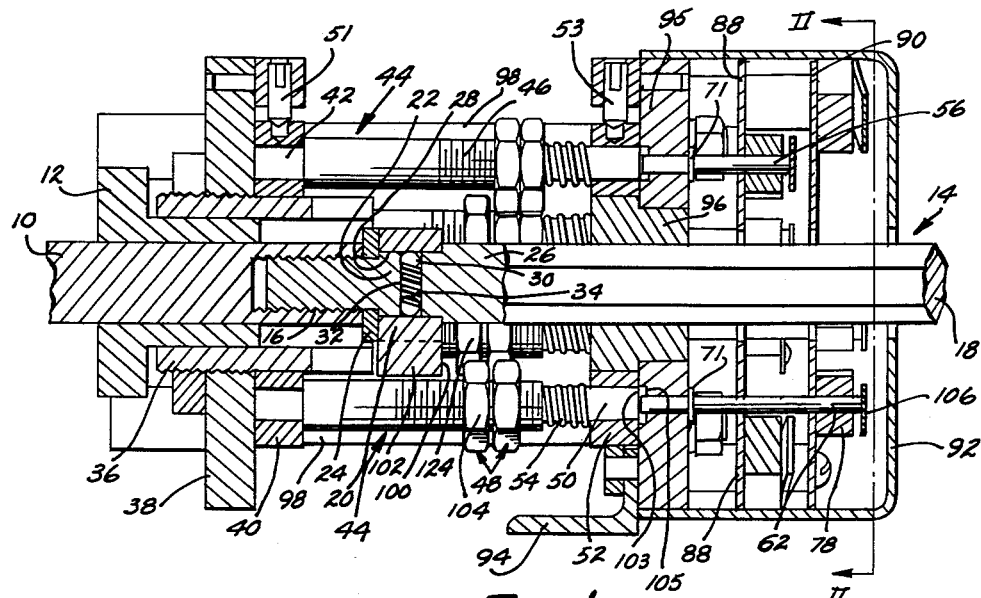
FIG. 1 is an axial vertical section of the device of this invention along line I—I of FIG. 2.
Figure 3:
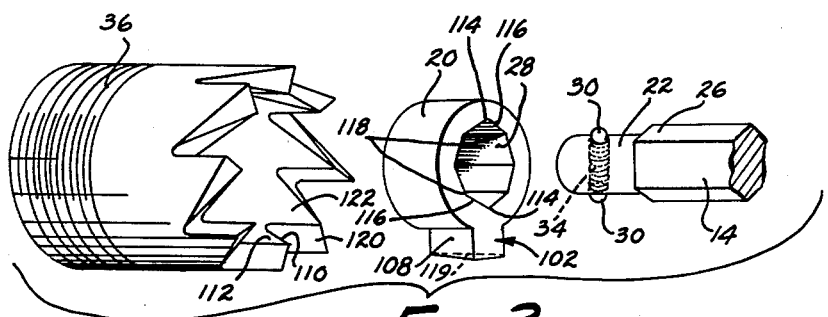
FIG. 3 is a fragmentary exploded perspective view showing the interrelationship of the striker member and ratchet.

Referring now to FIG. 1, the numeral 10 designates the drive rod to which reciprocating motive power is applied by any convenient means such as a hydraulically or pneumatically operated piston. It will be understood that the drive rod 10 may equally well be mechanically reciprocated by a motor or the like. The drive rod 10 is arranged to reciprocate in an annular guide bearing 12. An actuator shaft 14 is rigidly connected to the drive rod 10 by a screwthreaded connection 16 and therefore reciprocates as a unit with drive rod 10. The end 18 of actuator shaft 14 may be extended to engage any desired mechanism whose reciprocating motion is to be controlled; hence the control of the linear movement of shaft 14 is the function to be achieved by the device of this invention. The striker member 20 is rotatably mounted on the cylindrical portion 22 of shaft 14 (see FIG. 3) and is held in place axially by washer 24 and the shoulder of the hexagonal portion 26 of shaft 14. As appears more clearly from FIG. 3, the inner surface 28 of the striker member 20 is octagonal in cross section in the illustrated embodiment. In any embodiment, the number of sides of the geometrical figure represented by the cross section of surface 28 is equal to the number of stop elements used, i.e. the number of teeth 112 in ratchet 36. Acting against the prismatic surface 28 are a pair of steel balls 30 seated in a diametrically extending bore 32 of shaft 14 and biased apart by a spring 34. A single ball biased against the shaft 14 itself, or any other equivalent detent means, may be used in the alternative.

Stationarily mounted with respect to bearing 12 is a ratchet 36. The ratchet 36 in turn may be screwthreadedly adjustable with respect to a rear mounting plate 38. The teeth of ratchet 36 extend forwardly in a manner best shown in FIG. 3. Fixed with respect to the mounting plate 38 is a rear ring 40 which slidably receives the rear ends 42 of the stop rods 44. Each stop rod 44 has a central threaded portion 46 along which a pair of stop nuts 48 can be positioned as desired. The forward ends 50 of the stop rod 44 are slidably mounted in the forward ring 52. The rings 40 and 52 are rotatable with respect to ratchet 36 and bushing 96, respectively, so that the entire stop element cage can be rotated to successively adjust all the stop elements from the top of the device. The rings 40 and 52 can be locked in operating position by setscrews 51 and 53, respectively.

Figure 2:
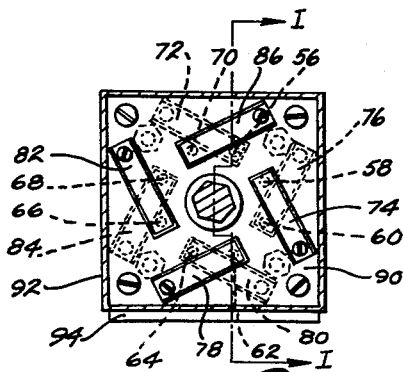
FIG. 2 is a vertical section along line II—II of FIG. 1.

The stop rods 44 are resiliently biased rearwardly by springs 54. Trip pins 56 through 70 (see also FIG. 2) are biased toward the stop elements 44 by the leaf-spring actuator switches 72 through 86, but their movement is limited by abutment of the stop rings 71 against mounting plate 95 so as to prevent the pins from interfering with rotation of the stop element cage. It will be noted that for reasons of economy of space, the switches are mounted in two layers, switches 72, 76, 80 and 84 being mounted on the rear deck 88, and switches 74, 78, 82 and 86 being mounted on the forward deck 90. The entire switch assembly is covered by a cover 92, and the entire device may be mounted on a suitable surface by one or more brackets 94. The front mounting plate 95 supports the actuator shaft bushing 96 and is rigidly connected to the rear mounting plate 38 by tie rods 98.

Operation

Let us now assume that the device is in the position shown in FIG. 1 and is in the process of making its forward stroke. In the position shown, the trip dog 20 has already cleared ratchet 36. In this condition, drive rod 10, washer 24, striker member 20, and actuator shaft 14 together with its balls 30 and spring 34 are moving to the right in FIG. 1, and all the other parts are stationary until face 100 of the ratchet or trip dog 102 strikes stop nut 104. As the forward movement of actuator shaft 14 now continues, the trip dog 102 pushes stop nut 104, and with it the stop rod 44 to which it is attached, forward against the bias of spring 54 until face 103 of the stop rod 44 strikes the bottom 105 of the pin groove in plate 95 to stop the forward movement of actuator shaft 14. This movement in turn pushes trip pin 62 forward so as to actuate switch 78 by bending its leaf spring 106. The actuation of switch 78 may initiate any desired manufacturing operation, at the conclusion of which power is applied to the drive rod 10 by valve reversal or any other appropriate means for movement in a rearward direction (to the left in FIG. 1).

As the drive-rod-and-actuator-shaft assembly moves rearwardly, the trip dog 102 allows the stop rod 44 and trip pin 62 to return to their initial positions under the influence, respectively, of spring 54 and leaf spring 106. The rearward movement of trip pin 62 now causes switch 78 to return to its normal position. As the actuator shaft 14 with its striker member 20 travels rearward, the inclined face 108 (FIG. 3) of trip dog 102 engages the surface 110 of ratchet tooth 112. As the rearward motion of the striker member 20 continues, the inclined surface 110 of tooth 112 causes trip dog 102, and with it striker member 20, to rotate counterclockwise in FIG. 3 about actuator shaft 14. During this rotation, the balls 30 are forced out of corners 114 by the faces 116 of the prismatic surface 28 so as to compress spring 34. When the trip dog 102 reaches the end of its rearward travel, the striker member 20 has been turned sufficiently so that the balls 30 are now closer to corners 118 than to corners 114, i.e. past the centers of flats 116. In this condition, the action of the spring 34 on the balls 30 tends to rotate the striker member 20 even farther so as to seat the balls 30 in the corners 118, but this movement is prevented by the abutment of surface 119 of trip dog 102 against surface 120 of tooth 122. At this point, the rearward movement of the drive rod is stopped by any appropriate automatic means, and if the work table is ready for the next operation, the movement of the drive rod is again reversed to the forward direction. As the actuator shaft with the striker member 20 now travels forward, the trip dog 102 eventually comes clear of tooth 122, and the balls 30 under the effect of spring 34 immediately complete the incremental counterclockwise rotation of striker member 20 so as to become seated in the corners 118. In the example illustrated, the incremental counterclockwise rotation of striker member 20 totals forty-five degrees, so that as the actuator shaft now goes forward, the trip dog 102 engages not the stop 104, but the stop 124. The engagement of trip dog 102 and stop 124 causes trip pin 60 (FIG. 2) to move forward to actuate switch 76. The actuation of switch 76 initiates the next manufacturing operation.

It will be noted that stop 124 is positioned farther to the left in FIG. 1 than is stop 104. Consequently, the forward movement of the actuator shaft 14 cannot progress as far on the second operation as it did on the first, and consequently the work piece will be in a different position during the second operation than it was during the first. It will be readily seen that the extent of movement of shaft 14 (and hence the position of the work table or other device actuated by shaft 14) during any given operation can be readily adjusted by moving the stops 48 along the threaded stop rods 44.

In the same manner, the reciprocating movement of drive rod 10 positions the work table as necessary for the remaining six operations. Each time drive rod 10 moves rearwardly, the striker member 20 is rotated through the greater portion of a forty-five degree arc; and each time the drive rod 10 moves forward, the striker member 20 completes its rotation through the forty-five degree arc and moves on to strike the next succeeding stop element to position the work table and initiate the next manufacturing operation.

It will be seen that this invention provides a simple but effective sequential linear positioner, whose compactness makes it particularly adaptable to fluid cylinders and to automation of small machine tools. Obviously, the invention can be carried out in many different ways, and it is therefore not desired that the invention be limited by the embodiment shown, but only by the scope of the following claims.

We claim:

1. A sequential linear positioning device comprising two spaced mounting plates having a plurality of stop supports extending therebetween around a centrally disposed shaft; means for mounting said shaft and stop supports for relative reciprocal movement; a plurality of stop elements mounted on said stop supports; a striker member rotatably mounted on said shaft between said plates but axially secured thereto; resilient means for holding said striker member in different rotatable positions in which the striker member is aligned with different ones of said stop stops; said resilient means including the bore of said striker member, which bore surrounds said shaft, being rectilinear in cross section providing a plurality of interconnected walls with junctures therebetween and resiliently biased detents mounted on said shaft and biased outwardly against said walls; indexing means for forcing against the bias of said resilient means the rotation of said striker member to said different rotatable position in response to relative reciprocable movement of said shaft and stop supports; said indexing means including a ratchet and a cooperating trip dog, one of said ratchet or trip dog being mounted securely to one of said plates between the plates and the other to said striker member and each having cam surfaces which engage each other to cause the forced rotation of said striker member.

2. An indexing means for positioning a rotatable member at predetermined rotary positions comprising a first ratchet means arranged concentric with the rotatable axis of said member; a second ratchet means extending radially from the axis of said member and operatively secured thereto; means for moving one of said first or second ratchet means along said axis; said first and second ratchet means having cooperating engageable surfaces for imparting rotary movement to said second ratchet means and thus to said member upon movement of said ratchet means toward each other; said second ratchet means including a member having a polygonal shaft opening concentric with said axis; a shaft extending through said opening and having detent means biased radially outwardly against the sides of said opening; said sides being arranged to receive the detent at the junctures thereof at which positions said first ratchet means is accurately positioned for engagement of its surfaces with said second ratchet means surfaces.

3. An indexing means for positioning a rotatable member at predetermined rotary positions comprising a first ratchet means arranged concentric with the rotatable axis of said member; a second ratchet means extending radially from the axis of said member and operatively secured thereto; means for moving one of said first or second ratchet means along said axis; said second ratchet means including a member having a polygonal shaft opening concentric with said axis; a shaft extending through said opening and having detent means biased radially outwardly against the sides of said opening; said sides being arranged to receive the detent at the junctures thereof at which positions said first ratchet means is accurately positioned for engagement of its cam surface with at least one of the second ratchet means' cam surface without interference with said peaks.

References Cited in the file of this patent
UNITED STATES PATENTS

| | | |
|---|---|---|
| 2,453,187 | Blain | Nov. 9, 1948 |
| 2,478,011 | Proffitt et al. | Aug. 2, 1949 |
| 2,528,519 | Jackson | Nov. 7, 1950 |
| 2,919,602 | Spraragen | Jan. 5, 1960 |

UNITED STATES PATENT OFFICE
CERTIFICATE OF CORRECTION

Patent No. 3,169,619                 February 16, 1965

Clair B. Alexander, Jr., et al.

It is hereby certified that error appears in the above numbered patent requiring correction and that the said Letters Patent should read as corrected below.

Column 6, lines 4 and 5, strike out "without interference with said peaks".

Signed and sealed this 28th day of September 1965.

(SEAL)
Attest:

ERNEST W. SWIDER                 EDWARD J. BRENNER
Attesting Officer                  Commissioner of Patents